UNITED STATES PATENT OFFICE.

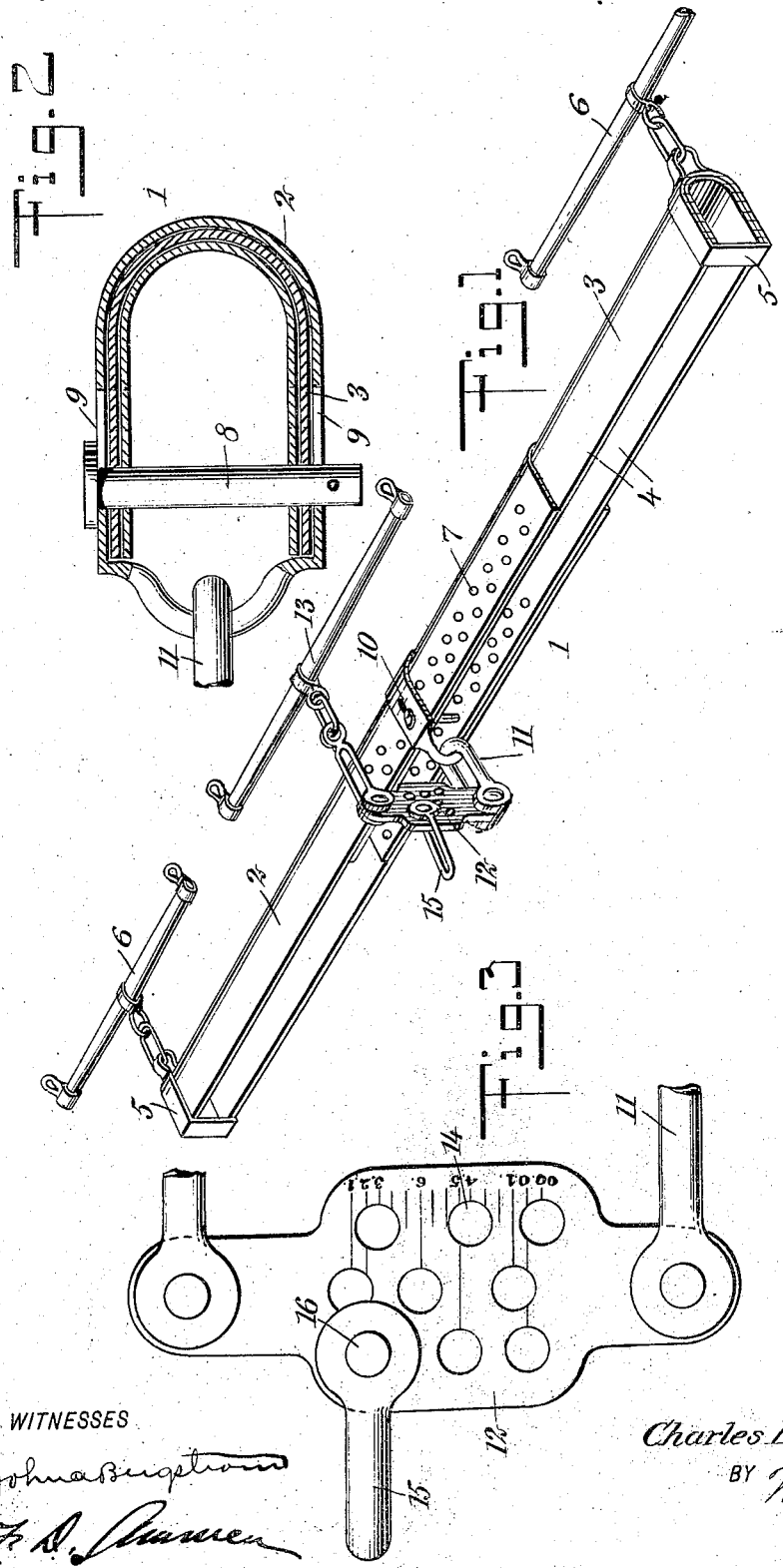

CHARLES ELSWORTH ESTABROOK, OF SPRINGPORT, INDIANA.

DRAFT MECHANISM.

No. 924,328.          Specification of Letters Patent.          Patented June 8, 1909.

Application filed May 21, 1908. Serial No. 434,023.

*To all whom it may concern:*

Be it known that I, CHARLES ELSWORTH ESTABROOK, a citizen of the United States, and a resident of Springport, in the county of Henry and State of Indiana, have invented a new and Improved Draft Mechanism, of which the following is a full, clear, and exact description.

This invention relates to draft mechanism such as used for drawing agricultural implements or vehicles.

The object of the invention is to produce a draft mechanism which will enable several horses or other draft animals, to be hitched in such a way that the work will be equally distributed among them. In other words, the lever arm from the point of application of the pulling force, will be adjustable to suit the power of the animal.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a perspective of a draft mechanism constructed according to my invention; Fig. 2 is a vertical section through the equalizer bar of the draft mechanism and illustrating the means for locking the parts of the equalizer bar together; Fig. 3 is a side elevation of the equalizer plate which constitutes a feature of the invention, certain parts being broken away.

Referring more particularly to the parts, 1 represents an equalizer bar which is formed of two sections or bars 2 and 3, which telescope with each other, as shown. These bars are of U section, the axis of the U being horizontal and the rounded part disposed forwardly in such a way that horizontal flanges 4 are formed. At the ends of the bars 2 and 3, clips 5 are attached, to which swingletrees 6 are connected. The flanges 4 of the bar sections 2 and 3, are provided with a plurality of openings 7 which are disposed in two rows in staggered relation. These openings 7 are adapted to register with each other, as indicated in Fig. 2, so as to enable the bars 2 and 3 to be connected together by a vertical pin 8, which pin passes downwardly through a slot 9 formed in a yoke or stirrup 10, which passes around the front of the bar, as indicated. To the rear of this stirrup, a shackle 11 is attached, and the rear end of this shackle is pivotally connected with an equalizer plate 12, to the upper end of which a swingletree 13 is connected. The plate 12 is provided with a plurality of openings 14 which are disposed in rows in staggered relation, and numbered as shown. In any one of the openings 14, a main shackle 15 is attached by means of a removable pin 16. This shackle is attached to the plow or other implement or vehicle which is to be drawn. It will be evident that the yoke 10 may be used to connect the bar sections 2 and 3 at different points between the swingletrees 6 so that the lever arm of either animal may be varied as desired. The end clips 5 present transverse vertical rear bars against which the rear edges of the members 2 and 3 abut; the forward portions of the clips are rounded so as to conform to the rounded forward edge of these parts.

The draft force which is developed by the two horses on the equalizer bar, may be balanced by the force developed by the single horse hitched to the swingletree 13, for the lever arm of the swingletree 13 at the equalizer plate 12 will ordinarily be greater than that of the two horses. This of course depends upon the position of the shackle 15 and its point of attachment to the plate. If the horse which is hitched to the swingletree 13 is unusually powerful, the shackle 15 will be attached higher up on the equalizer plate so that the lever arm of the powerful horse will be shortened. It will be evident that in this way the two horses hitched to the equalizer bar can be balanced against each other and the force developed through the equalizer bar can be balanced with the force which is exerted through the swingletree 13. In this way the lever arms are made proportional to the force exerted by the different animals. If desired, the equalizer bar sections 2 and 3 may be completely telescoped with each other so as to transform the bar into an ordinary doubletree to be used with two horses only.

It will be evident from an inspection of Fig. 1 that the equalizer bar may be changed in a moment and made into a short 2-hitch plain doubletree, or a medium length wagon doubletree; or a long 3-horse doubletree, and it can be adjusted to give either animal hitched to it the advantage of an easier pull.

If the effective length of the equalizer plate 12 were divided into three parts, the openings marked 1, 1, would lie near the division mark, in other words, if the shackle 15 were attached in the lower opening marked 1, the shackle 11 would have half the lever arm of the swingletree 13. Now if one should wish to give the single horse a slight advantage or longer leverage, the shackle 15 can be shifted down to the lower opening marked 0, if a still further advantage were to be given the single horse, the shackle could be slipped down to the opening marked 0 0. If it were desired on the other hand to give an advantage or longer leverage to the two horses, the shackle 15 can be hitched in one of the openings marked 4, 5 or 6. The numbers 2, 3, at the upper portion of the plate give a slightly different leverage from the upper opening marked 1. The corresponding numbers 2 and 3 for the lower portion of the plate, as shown in Fig. 3, have been omitted, but the division lines are placed on the plate so as to indicate where these openings would be if they were used. Similar division lines are used in the upper portion of the plate to indicate the position of the openings which are omitted, but which would be marked 4 and 5. The mark just below the number 6 indicates the middle point of the plate.

The U-form of the equalizer bar is particularly advantageous on account of the fact that the flanges are presented in a horizontal plane so as to resist the forces acting upon the bar, and these flanges present a sufficient breadth to receive the rows of openings 7 by means of which the two parts of the bar are connected. By arranging the rows of bolt holes in a staggered relation they do not reduce the strength of the bar at points where they occur.

Having thus described my invention, I claim as new and desire to secure by Letters Patent,—

1. In a draft mechanism, in combination, an equalizer bar formed of telescoping members open at their rear sides, presenting rounded forward edges and rearwardly projecting flanges, clips having cross bars at their rear portions engaging the rear edges of said flanges and having rounded forward portions receiving the curved forward edges of said flanges, and means for securing said members against longitudinal movement near the middle portion of said equalizer bar.

2. In a draft mechanism, in combination, an equalizer bar formed of telescoping members of substantially U section, having rounded forward sides and rearwardly projecting flanges, clips attached to the ends of said members and having bars engaging the rear edges of said flanges, swingletrees attached to said clips, said members having a plurality of openings formed in their telescoping portions, said openings being disposed in rows in a staggered relation, a yoke adapted to shift on said equalizer bar at said openings and having slots adapted to register with the openings of said rows, a through bolt passing through said slots and said registering openings, a shackle attached to said yoke, an equalizer plate attached to said shackle, and a swingletree attached to said equalizer plate.

3. In a draft mechanism, in combination, an equalizer bar formed of telescoping members of U cross section presenting rounded forward edges and rearwardly projecting flanges, said flanges having a double row of bolt openings formed therein adapted to register together, a shackle disposed around said bar at the point where said members telescope, said shackle having a slot therein disposed transversely of said bar, and a bolt extending transversely of said bar and certain of said openings, securing said shackle to said bar and securing said members against longitudinal movement with respect to each other.

In testimony whereof I have signed my name to this specification in the presence of two subscribing witnesses.

CHARLES ELSWORTH ESTABROOK.

Witnesses:
 JOSEPH J. HICKMAN,
 CLIDE E. CRABILL.